United States Patent [19]
Fitzgerald

[11] Patent Number: 5,835,361
[45] Date of Patent: Nov. 10, 1998

[54] SWITCH-MODE POWER SUPPLY WITH OVER-CURRENT PROTECTION

[75] Inventor: William Vincent Fitzgerald, Zionsville, Ind.

[73] Assignee: Thomson Consumer Electronics, Inc., Indianapolis, Ind.

[21] Appl. No.: 838,301

[22] Filed: Apr. 16, 1997

[51] Int. Cl.[6] .......................... H02M 3/335; H02M 7/122
[52] U.S. Cl. ................................. 363/21; 363/56
[58] Field of Search .................... 363/21, 56, 80, 363/93, 95, 132; 361/18, 86, 87, 93, 100

[56] References Cited

U.S. PATENT DOCUMENTS

| | | | |
|---|---|---|---|
| 3,893,006 | 7/1975 | Algeri et al. | 361/227 |
| 4,037,271 | 7/1977 | Keller | 363/21 |
| 4,058,758 | 11/1977 | Peterson | 363/80 |
| 4,063,307 | 12/1977 | Stephens | 363/21 |
| 4,156,273 | 5/1979 | Sato | 363/56 |
| 4,210,947 | 7/1980 | Koizumi | 361/18 |
| 4,263,643 | 4/1981 | Koike | 363/19 |
| 4,330,816 | 5/1982 | Imazeki et al. | 363/56 |
| 4,447,841 | 5/1984 | Kent | 361/18 |
| 4,561,047 | 12/1985 | DePuy | 361/56 |
| 4,672,524 | 6/1987 | Toriyama et al. | 363/56 |
| 4,686,617 | 8/1987 | Colton | 363/56 |
| 4,763,238 | 8/1988 | Philippe Maige | 363/21 |
| 4,928,200 | 5/1990 | Redl et al. | 361/93 |
| 5,028,861 | 7/1991 | Pace et al. | 323/222 |
| 5,101,336 | 3/1992 | Willocx et al. | 363/41 |
| 5,171,949 | 12/1992 | Fujishima et al. | 219/10.55 |
| 5,267,133 | 11/1993 | Motomura et al. | 363/21 |
| 5,304,917 | 4/1994 | Somerville | 320/32 |
| 5,335,162 | 8/1994 | Martin-Lopez et al. | 363/97 |
| 5,350,997 | 9/1994 | Ghotbi et al. | 323/268 |

FOREIGN PATENT DOCUMENTS

| | | | |
|---|---|---|---|
| 086 521 A1 | 8/1983 | European Pat. Off. | H04N 3/18 |
| 240 434 A1 | 10/1987 | European Pat. Off. | H02H 7/122 |
| 387 961 A1 | 9/1990 | European Pat. Off. | H02M 3/338 |

OTHER PUBLICATIONS

U.S. application No. 08/537,965, Fitzgerald, filed Oct. 1995.
"Power Supply Cookbook", 4.4 Designing the Resonant Tank Circuit, Marty Brown, Motorola Series in Solid State Electronics, Copyright©1994 by Butterworth–Heinemann, p. 137.
"Current–sensing IC improves regulation of power supplies", Glenn Fritz and Larry Wofford, *Electronics Products, Power Supplies*, Jun 17, 1985, pp. 77–82.
TEA 2260 High Performance Driver Circuit for SMPS, Application Note, SGS–Thomson Microelectronics, Apr. 1989, pp. 1–47.

*Primary Examiner*—Adolf Berhane
*Attorney, Agent, or Firm*—Joseph S. Tripoli; Joseph J. Laks; Sammy S. Henig

[57] ABSTRACT

In a tuned switch mode power supply a zero voltage is maintained across a transistor switch, during both turn off and turn of switching transition intervals in the transistor switch. The tuned switch mode power supply operates in a current-mode control, on a current pulse-by-current pulse control basis. An over-current protection circuit disables the transistor switch when an over-current condition persist longer than a first interval that is substantially longer than a period of a given current pulse in the transistor switch. The operation of the transistor switch is undisturbed, when the over-current condition lasts only a shorter interval than the first interval.

13 Claims, 2 Drawing Sheets

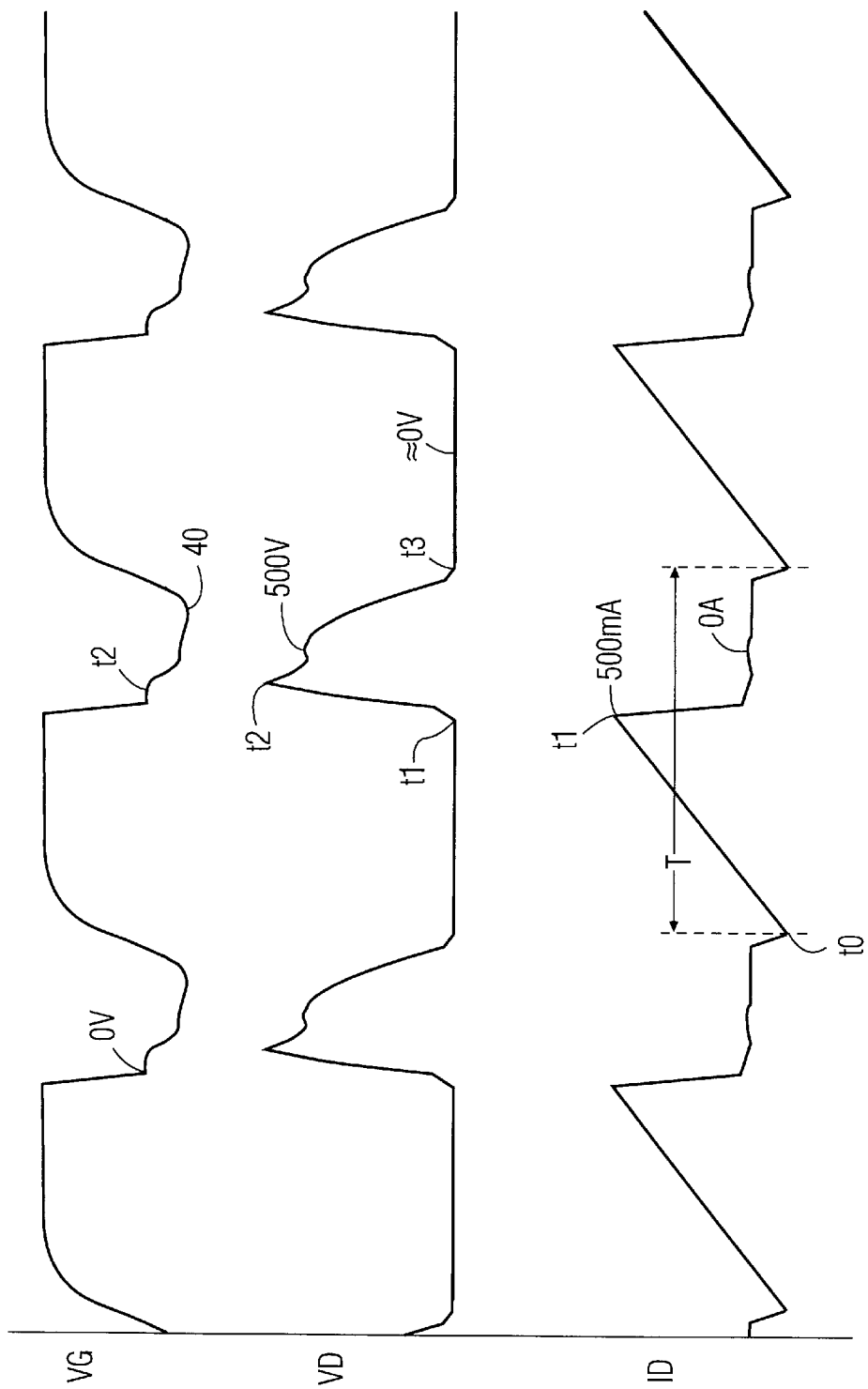

SWITCH-MODE POWER SUPPLY WITH OVER-CURRENT PROTECTION

The invention relates to a switch mode power supply.

A typical switch-mode power supply (SMPS) includes a series arrangement of an inductance and a bi-directional controllable switch connected to input supply voltage terminals for receiving an input supply voltage. The switch is formed by a parallel arrangement of a transistor and a damper diode. A drive or control circuit provides switching pulses for driving the switch alternately into the conducting and the cut-off states, the duration of the conducting state of the switch being controllable in dependence upon the output voltage by rectification of oscillations produced during periods when the switch is cut-off.

A modulator in a regulation control circuit of some prior art SMPS's is responsive to an error signal produced in an error amplifier for varying a length of an interval when the bi-directional switch is conductive. The peak of the current in the inductance is thereby controlled. In this way, the amplitude of the resonant pulse voltage that is developed when the bi-directional switch is turned off is controlled for providing output voltage regulation.

The SMPS may operate in a current-mode control, on a current-pulse by current-pulse control basis. The current flowing in a transistor switch terminates when it reaches a threshold level established by an error signal. The error signal actually controls the peak current in an inductance that is coupled to the transistor switch. In this way, the control circuit corrects instantaneously in a feed forward manner for input voltage variations without using the dynamic range of the error amplifier.

The transistor switch and a winding of a transformer, typically coupled to it, may not be harmed by switch current that exceeds a tolerance range of the transistor switch, if the duration of excessive current is short. For example, during a short start-up interval of a motor used in a video disk driver and energized by a SMPS. However, when a fault condition occurs and excessive current persists for a prolonged interval, the transistor switch and the transformer winding may be harmed.

Therefore, it may be desirable to protect the SMPS against excessive current that persists for a prolonged interval at a level that is smaller than a current limit established by the current-mode control circuitry. In this way, a transistor switch with a lower maximum current limit can be used. Advantageously, a transistor switch with lower maximum current limit is less expensive.

A switch mode power supply apparatus, embodying an aspect of the invention, includes a source of an input supply voltage and an inductance coupled to the source of input supply voltage. A first transistor switch is coupled to the inductance and is responsive to a periodic, switch control signal for generating current pulses in the inductance that are coupled to a load circuit for generating an output of the power supply. A modulator is responsive to a signal indicative of a given current pulse for generating the switch control signal to control the power supply output in a current mode control, on a current-pulse-by-current pulse basis. An over-current protection circuit is responsive to the current pulse indicative signal for disabling the power supply output when an over-current condition occurs. A current sensor is responsive to the given current pulse for generating the current pulse indicative signal that is coupled to each of the over-current protection circuit and the modulator via corresponding signal paths.

FIGS. 2a, 2b and 2c illustrate wave forms useful for the explanation of the tuned SMPS of FIG. 1.

Figure 1:
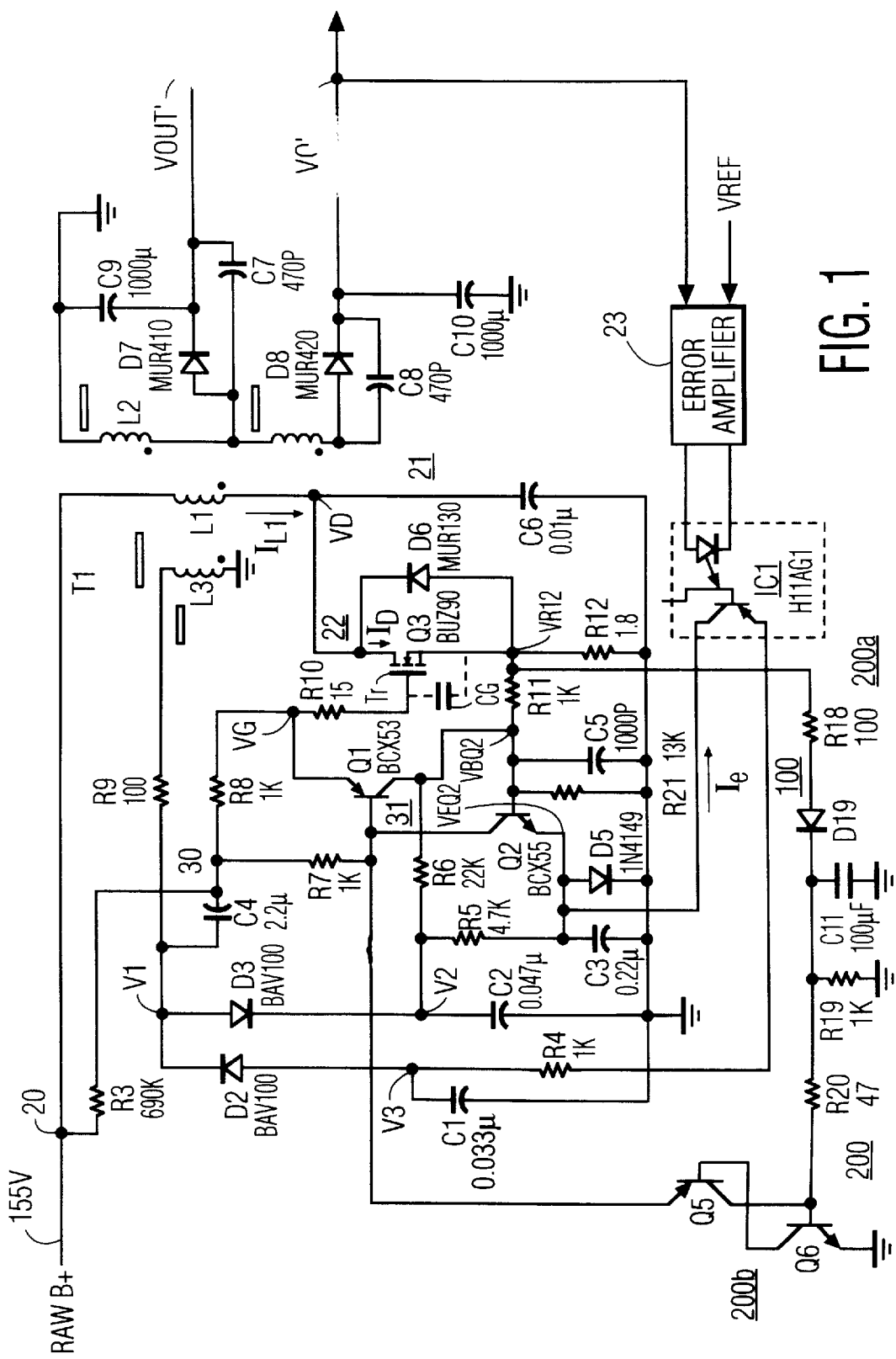
FIG. 1 illustrates a tuned SMPS embodying an aspect of the invention.

FIG. 1 illustrates a tuned SMPS 100, embodying an aspect of the invention. In FIG. 1, an N-type, metal oxide semiconductor (MOS) power transistor Tr operating as a transistor switch has a drain electrode coupled through a primary winding L1 of a transformer T1 to a terminal 20 of an input supply, direct current (DC) voltage B+. In a circuit configuration, not shown, the transformer can serve as an isolation transformer. Voltage B+ is derived from, for example, a filter capacitor coupled to a bridge rectifier that rectifies a mains supply voltage, not shown.

A source electrode of transistor Tr is coupled to a ground or common terminal via a current sensor or sampling resistor R12. A damper diode D6 operating as a switch is coupled in parallel with transistor Tr and is included in the same package with transistor Tr to form a bi-directional switch 22. Capacitor C6 is coupled in parallel with diode D6 and in series with winding L1 to form with an inductance of winding L1 a resonant circuit 21 when switch 22 is non conductive.

A secondary winding L2 of transformer T1 is coupled to an anode of a peak rectifying diode D8 and to ground for generating an output voltage VOUT in a filter capacitor C10 that is coupled to a cathode of diode D8. Voltage VOUT is coupled to a load circuit, not shown. Similarly, an output voltage VOUT' in a filter capacitor C9 is a peak rectified voltage developed by a rectifier diode D7.

An error amplifier 23 is responsive to voltage VOUT and to a reference voltage VREF. A photo-coupler IC1 includes a light emitting diode. An emitter electrode of the transistor of photo-coupler IC1 is coupled to a negative DC voltage V3 via a resistor R4. A collector electrode of the transistor of photo-coupler IC1 is coupled to capacitor C3. In a circuit configuration not shown the opto-coupler can serve for isolation. An error collector current Ie of the opto-coupler IC1 is indicative of an amount by which voltage VOUT is greater than reference voltage VREF and, thus, of the difference between them.

A comparator transistor Q2 has a base electrode that is coupled via a resistor R11 to a junction terminal between the source electrode of transistor Tr and current sensor resistor R12. Transistor Q2 compares a base voltage VBQ2 of transistor Q2 to an error voltage VEQ2 developed at the emitter of transistor Q2. Voltage VBQ2 includes a first portion that is proportional to a source-drain current ID in transistor Tr. A DC voltage V2 is coupled via a resistor R6 to the base of transistor Q2 to develop a second portion of voltage VBQ2 across resistor R11.

DC voltage V2 is also coupled via a resistor R5 to a feedback loop filter formed by capacitor C3 to form a current source that charges capacitor C2. Error current Ie is coupled to capacitor C3 for discharging capacitor C3. A diode D5 is coupled between the emitter of transistor Q2 and ground. Diode D5 limits voltage VEQ2 to diode D5 forward voltage and limits the maximum current in transistor Tr.

The collector electrode of transistor Q2 is coupled to the base electrode of a transistor Q1 and the collector electrode of transistor Q1 is coupled to the base electrode of a transistor Q2 to form a regenerative switch 31. A control voltage VG of transistor Tr is developed at the emitter of transistor Q1 that forms an output terminal of regenerative switch 31 and is coupled to the gate electrode of transistor Tr via a resistor R10.

A secondary winding L3 of transformer T1 is coupled via a resistor R9 for producing an alternating current (AC) voltage V1. Voltage V1 is AC-coupled via a capacitor C4 and a resistor R8 to the emitter of transistor Q1 to generate drive voltage VG of transistor Tr. AC-coupled voltage V1 is coupled via a collector resistor R7 to the collector electrode of transistor Q2 and to the base electrode of transistor Q1. Voltage V1 is also rectified by a diode D2 to generate voltage V3 and by a diode D3 to generate voltage V2.

A resistor R3 coupled between the source of voltage B+ and a terminal 30 of capacitor C4 that is remote from winding L3 charges capacitor C4 upon power on or start up. When voltage VG on the gate electrode of transistor Tr exceeds a threshold voltage of MOS transistor Tr, Transistor Tr conducts causing a drain voltage VD of transistor Tr to decrease. As a result, voltage V1 becomes positive and reinforces voltage VG for maintaining transistor Tr, in a positive feedback manner, fully turned on.

FIGS. 2a–2c illustrate wave forms useful for explaining the operation of tuned SMPS 100 of FIG. 1. Similar symbols and numerals in FIGS. 1 and 2a–2c indicate similar items or functions.

During an interval t0–t1 of a given period T of FIG. 2c, current ID of conductive transistor Tr of FIG. 1 is up-ramping. Consequently, a corresponding non-resonant current pulse portion of a current IL1 in winding L1 is up-ramping and stores magnetic energy in the inductance associated with winding L1 of transformer T1. At time t1 of FIG. 2c, voltage VBQ2 of FIG. 1, containing an up-ramping portion derived from the voltage across resistor R12, exceeds a triggering level of regenerative switch 31 that is determined by voltage VEQ2 and turns on transistor Q2. Current flows in the base of transistor Q1 and regenerative switch 31 applies a low impedance at the gate electrode of transistor Tr. Consequently, gate electrode voltage VG of FIG. 2a is reduced to near zero volts and turns off transistor Tr of FIG. 1. When transistor Tr is turned off, drain voltage VD of FIG. 2b increases and causes voltage V1 of FIG. 1 that is coupled from winding L3 to decrease. The charge stored in gate-source capacitance CG maintains latch mode operation until time t2 of FIG. 2a.

When voltage VG becomes smaller than required to maintain sufficient collector current in transistor Q1 of FIG. 1, a forward conduction on the base electrode of transistor Q2 ceases and, consequently, latch operation mode in regenerative switch 31 is disabled. Afterwards, voltage V1 that continues to decrease causes a negative portion 40 of voltage VG of FIG. 2a to maintain transistor Tr of FIG. 1 turned off.

When transistor Tr is turned off, drain voltage VD increases as shown during interval t1–t2 of FIG. 2b. Capacitor C6 of FIG. 1 limits the rate of increase of voltage VD such that transistor Tr is completely non conductive before voltage VD increases appreciably above zero voltage. Thereby, switching losses and radiated switching noise are, advantageously, reduced. Resonant circuit 21 that includes capacitor C6 and winding L1 oscillates, during interval t1–t3 of FIG. 2b, when transistor Tr of FIG. 1 is turned off. Capacitor C6 limits the peak level of voltage VD. Therefore, advantageously, no snubber diode and resistor are needed so that efficiency is improved and switching noise is reduced.

The decrease in voltage VD prior to time t3 of FIG. 2b, causes voltage V1 of FIG. 1 to become a positive voltage. At time t3 of FIG. 2b, voltage VD is close to zero volts and slightly negative, causing damper diode D6 of FIG. 1 to turn on and to clamp voltage VD of FIG. 2b to approximately zero volts. Thus, resonant circuit 21 of FIG. 1 exhibits a half cycle of oscillation. After time t3 of FIG. 2b, voltage VG of FIG. 2a becomes increasingly more positive, because of the aforementioned change in polarity of voltage V1 of FIG. 1.

Advantageously, the following turn on of transistor Tr is delayed by a delay time that is determined by the time constant of resistor R8 and gate capacitance CG until after time t3 of FIG. 2b when voltage VD is nearly zero volts. Therefore, minimal turn-on losses are incurred and switching noise is reduced.

Negative feedback regulation of voltage VOUT is achieved by varying voltage VEQ2 in filter capacitor C3. When Voltage VOUT is larger than voltage VREF, current Ie discharges capacitor C3 and decreases voltage VEQ2. Therefore, the threshold level of comparator transistor Q2 is decreased. Consequently, the peak value of current ID in transistor Tr and the power delivered to the load circuit, not shown, are reduced. On the other hand, when voltage VOUT is smaller than voltage VREF, current Ie is zero and the current in resistor R5 increases voltage VEQ2. Consequently, the peak value of current ID in transistor Tr and the power delivered to the load circuit, not shown, are increased. Thus, the control circuit of transistor Q3 that includes regenerative switch 31 provides duty cycle modulation of current ID in transistor Q3, in accordance with voltage VEQ2.

Tuned SMPS 100 operates in a current mode control, on a current-pulse by current-pulse control basis. The current pulse of current ID during interval t0–t1 of FIG. 2c, flowing in transistor Tr of FIG. 1, terminates at time t1 of FIG. 2c when it reaches the threshold level of transistor Q2 of FIG. 1 that is determined by voltage VEQ2 and is established by error current Ie forming an error signal. The error signal actually controls the peak current of the current pulse of current ID that flows in the inductance of winding L1. Advantageously, the control circuit corrects instantaneously in a feed forward manner for input voltage variations of voltage B+ without using the dynamic range of error amplifier 23. In this way, both the advantages of current mode regulation and of tuned SMPS are obtained.

An over-current protection circuit 200, embodying an inventive feature, includes a rectifier 200a. Rectifier 200a includes a resistor R18 coupled in series with a rectifying diode D19 that are coupled between a junction terminal, in which voltage VR12 is developed, and an integrator capacitor C11. A resistor R19 is coupled in parallel with capacitor C11 for providing a discharge path to the charge stored in capacitor C11. The voltage in capacitor C11 is coupled via a base current limiting resistor R20 to a base electrode of a transistor Q6. Transistor Q6 is coupled to a transistor Q5 to form an R-S flip-flop or latch 200b. The emitter of transistor Q5 is coupled to the base of transistor Q1 for turning on transistor Q1 in a manner to disable transistor Q3 when transistor Q5 is conductive.

The time constant of resistor R18 and integrator capacitor C11 determines the long-term peak value of voltage VR12 across resistor R12. When excessive load current produces excessive current ID in transistor Q3, during a sufficiently long interval, such as several hundred milliseconds, capacitor C11 voltage will gradually increase in from one cycle to the next one of current ID When the voltage in capacitor C11 becomes sufficiently high to turn on transistor Q6, a regenerative action causes transistor Q5 to turn on. The result is that latch 200b begins operating as a conductive switch for shunting drive voltage VG from the gate of transistor Q3. Consequently, the power supply ceases oscillating and ceases providing power to the loads.

In accordance with an inventive feature, over-current protection circuit 200 disables transistor Q3 when an over-current condition persists for a longer interval, for example, over a several hundred millisecond interval, than permitted for safe operation of transistor Q3. Conversely, when the over-current condition lasts for only a shorter interval, the operation of transistor Q3 is undisturbed.

Advantageously, the peak level of current ID can exceed, during a short term interval, a predetermined, safe value, under the condition that the length of the interval, during which current ID is high, is relatively short. Circuit 200 establishes the length of the short term interval and the predetermined, long, term safe value of current ID. Advantageously, the required maximum current tolerance range of transistor Q3 can be relaxed, because transistor Q3 may not be harmed by current ID that exceeds the tolerance range, when the duration of excessive current is short. For example, during a short start-up interval of a motor used in a video disk driver and energized by SMPS 100. However, when a fault condition occurs and potentially harmful excessive current persists for a prolonged interval, transistor Q3 is protected against such overcurrent condition.

Following the power shutdown, capacitor C11 is gradually discharged. When the current flowing in transistors Q5 and Q6 drops below the level that maintains the latch condition, conduction ceases and the power supply begins a normal start-up sequence. The on and off cycling continues as long as the abnormal high load is present. Resistor R19 provides a discharge path for capacitor C11 to allow normal peak load currents to be provided without causing the transistors of latch 200b to turn on.

As indicated before, DC voltage V2 is coupled via resistor R6 to the base of transistor Q2 to develop the second portion of voltage VBQ2 across resistor R11. During interval t0–t1 of FIG. 2c, voltage V2 of FIG. 1 is equal to voltage B+ multiplied by the turn ratio of windings L3 and L1 of transformer T1.

The threshold level of transistor Q2 varies in accordance with voltage V2 and, therefore, in accordance with voltage B+. Thus, the peak value of current ID also varies in accordance with voltage B+. Advantageously, this feature tends to maintain a constant power delivery capability of SMPS 100 so that excessive power cannot be delivered at high AC mains supply voltage, not shown.

In accordance with another inventive feature, voltage VR12 is coupled to each of comparator transistor Q2 of the duty cycle modulator and to over-current protection circuit 200a via signal paths that exclude transistor Q3. Advantageously, by using current sensor resistor R12 to generate voltage VR12 in common to both the duty cycle modulator and over-current protection circuit 200a, the circuitry is simplified.

What is claimed is:

1. A switch mode power supply apparatus, comprising:
   a source of an input supply voltage;
   an inductance coupled to said source of said input supply voltage;
   a first transistor switch coupled to said inductance and responsive to a periodic, switch control signal for generating current pulses in said inductance that are coupled to a load circuit for generating an output of said power supply;
   a modulator responsive to a signal indicative of a given current pulse for generating said switch control signal to control said power supply output in a current mode control, on a current-pulse-by-current-pulse basis;
   an over-current protection circuit responsive to said current pulse indicative signal for reducing said power supply output when an over-current condition persists during a plurality of said current pulses, the power supply output reduction operation being disabled when said over-current condition persists during a smaller number than said plurality of current pulses; and
   a current sensor responsive to said given current pulse for generating said current pulse indicative signal that is coupled to each of said over-current protection circuit and said modulator via corresponding signal paths.

2. An apparatus according to claim 1, wherein each of said signal paths excludes said first transistor switch.

3. An apparatus according to claim 1, wherein said over-current protection circuit comprises a rectifier responsive to said current pulse indicative signal and coupled to a filter capacitor for generating a ramping capacitor voltage that ramps at a rate determined in accordance with a time constant associated with said capacitor, as each current pulse occurs, and a detector for detecting when said ramping capacitor voltage reaches a threshold level associated with said over-current condition.

4. An apparatus according to claim 3, wherein said capacitor is coupled to a regenerative switch that is coupled to a control terminal of said first transistor switch to disable said first transistor switch when said capacitor voltage reaches a triggering level of said regenerative switch.

5. An apparatus according to claim 1, wherein said over-current protection circuit disables power supply output when said over-current condition persists for an interval that is substantially longer than a period of said given current pulse.

6. An apparatus according to claim 1 further comprising, a capacitance coupled to said inductance to form a tuned, resonant circuit, wherein said switch control signal is generated in a manner to maintain a substantially zero voltage between a pair of main current conducting terminals of said first transistor switch, when said first transistor switch is being turned on.

7. An apparatus according to claim 6, wherein in a given switching period of said first transistor switch, a resonant pulse is developed in said resonant circuit that forms one half cycle of oscillation in said resonant circuit.

8. An apparatus according to claim 6 further comprising, a second switch coupled to said first transistor switch for applying a low impedance between said main current conducting terminals to maintain the substantially zero voltage between said main current conducting terminals of said first transistor switch when said first transistor switch is being turned on.

9. An apparatus according to claim 8 wherein said second switch comprises a damper diode that is coupled in parallel with said first transistor switch.

10. An apparatus according to claim 1, further comprising a source of a second signal for controlling said output of said power supply in accordance with said second signal, wherein said current sensor comprises a resistor coupled in series with said first transistor switch for generating a ramping voltage that is indicative of a ramping portion of said current pulse and coupled to said modulator for causing a state of said switch control signal to change, during said ramping portion of said given current pulse, when said given current pulse exceeds a threshold level that is determined by said second signal.

11. A switch mode power supply apparatus, comprising:
    a source of an input supply voltage;
    an inductance coupled to said source of said input supply voltage;
    a transistor switch coupled to said inductance and responsive to a periodic, switch control signal for generating current pulses in said inductance that are coupled to a load circuit for generating an output of said power supply;
    a modulator responsive to a given current pulse for generating said switch control signal to control said given current pulse in a current mode control, on a current-pulse-by-current-pulse basis, said current pulse varying in a ramping manner and being coupled to a first regenerative switch that is coupled to said control terminal of said transistor switch to disable said transistor switch in each period of said current pulses, when a threshold level of said first regenerative switch is exceeded; and an over-current protection circuit responsive to said current pulses, and including a second regenerative switch that is coupled to said control terminal of said first transistor switch for disabling said transistor switch when an over-current condition occurs, said over-current condition occurring when a magnitude of said current pulses exceeds a first value and persists longer than a first interval that is substantially longer than a period of said given current pulse, the operation of said transistor switch being undisturbed, when said magnitude of said current pulses exceeds said first value during a shorter interval than said first interval.

12. An apparatus according to claim 1 further comprising a pulse integrator coupled in the signal path of said over-current protection circuit and not in the signal path of said modulator.

13. An apparatus according to claim 12 wherein said pulse integrator comprises a capacitor for integrating a portion of said given current pulse.

* * * * *